United States Patent
Pal et al.

(10) Patent No.: US 11,580,279 B1
(45) Date of Patent: Feb. 14, 2023

(54) SYSTEM AND METHOD FOR PERFORMING A THERMAL SIMULATION OF A POWDER BED BASED ADDITIVE PROCESS

(71) Applicant: Ansys, Inc., Canonsburg, PA (US)

(72) Inventors: Deepankar Pal, Salt Lake City, UT (US); Zack Francis, Pittsburgh, PA (US)

(73) Assignee: Ansys, Inc., Canonsburg, PA (US)

( * ) Notice: Subject to any disclaimer, the term of this patent is extended or adjusted under 35 U.S.C. 154(b) by 458 days.

(21) Appl. No.: 16/866,617

(22) Filed: May 5, 2020

(51) Int. Cl.
*G06F 30/23* (2020.01)
*B29C 64/386* (2017.01)
*G06T 17/00* (2006.01)
*B22F 10/00* (2021.01)
*G06F 119/08* (2020.01)
*B22F 10/10* (2021.01)

(52) U.S. Cl.
CPC .............. *G06F 30/23* (2020.01); *B22F 10/00* (2021.01); *B29C 64/386* (2017.08); *G06T 17/00* (2013.01); *B22F 10/10* (2021.01); *G06F 2119/08* (2020.01)

(58) Field of Classification Search
CPC ...... G06F 30/23; G06F 2119/08; B22F 10/00; B22F 10/10; B29C 64/386; G06T 17/00
See application file for complete search history.

(56) References Cited

U.S. PATENT DOCUMENTS

| 10,635,088 | B1* | 4/2020 | Bandara | B29C 64/393 |
|---|---|---|---|---|
| 2017/0090462 | A1* | 3/2017 | Dave | B33Y 50/00 |
| 2019/0039183 | A1* | 2/2019 | Morton | B23K 26/082 |
| 2019/0275585 | A1* | 9/2019 | Akram | B22F 10/38 |

FOREIGN PATENT DOCUMENTS

| CN | 109874322 A | * | 6/2019 | ......... B29C 64/268 |
| CN | 109937387 A | * | 6/2019 | ............. G01J 5/004 |
| CN | 107530971 B | * | 11/2019 | ......... B29C 64/393 |
| CN | 110520280 A | * | 11/2019 | ......... B29C 64/163 |
| WO | WO 2018015554 A1 | * | 1/2018 | ............. B33Y 10/00 |
| WO | WO 2020006468 A1 | * | 1/2020 | ......... G05B 19/4099 |

\* cited by examiner

*Primary Examiner* — Kandasamy Thangavelu
(74) *Attorney, Agent, or Firm* — Jones Day

(57) ABSTRACT

A method for performing a thermal simulation of an additive manufacturing process that includes accessing a voxel model representing a representative system using one or more processors. The voxel model includes a first transition associated with a first group of one or more voxels transitioning between liquid and vapor, a second transition associated with a second group of one or more voxels transitioning between solid and liquid, a third transition associated with a third group of one or more voxels undergoing sinter, and a fourth transition associated with a fourth group of one or more voxels undergoing a solid state phase change. The method determines a flux imbalance metric based on a flux, a rate of change of the first transition, a rate of change of the second transition, a rate of change of the third transition, and a rate of change of the fourth transition. The method determines one or more temperatures for the representative system based on the flux imbalance metric.

29 Claims, 12 Drawing Sheets

SYSTEM AND METHOD FOR PERFORMING A THERMAL SIMULATION OF A POWDER BED BASED ADDITIVE PROCESS

TECHNICAL FIELD

The technology described herein relates generally to thermal simulation tools and more particularly to systems and methods for performing a simulation of an additive manufacturing process and producing an additive manufacturing component therefrom.

BACKGROUND

FIG. 1 is a diagram depicting an example additive manufacturing (e.g., 3D printing) process that utilizes a laser powder bed fusion (LPBF) technique. LPBF additive manufacturing is commonly used to fabricate metal parts from a metallic powder. A typical LPBF additive manufacturing system 100, as shown in FIG. 1, includes a laser emitting device 102 and a powder deposition device 104 that are controlled by a computer system (not shown) based, for example, on a stereo lithography (STL) file, to generate a solid geometry 106 from a metallic powder (referred to as the powder feedstock). In operation, the laser beam interacts with a layer of the metallic powder, which is heated and absorbs a portion of the laser power. The solid geometry 106 is created by rolling down a layer of the powder feedstock using the powder deposition device 104, melting or sintering the powder layer with a beam emitted by a heat source such as the laser emitting device 102 in a specific pattern, allowing the melted layer to cool into a solid, and repeating the process to build the solid geometry 106, layer-by-layer. While this application may refer to laser powder bed fusion welding, the invention may also be applied to other additive welding methods. Previous additive manufacturing systems failed to accurately predict and account for keyhole formation during the additive manufacturing process, thus causing errors in the solid geometry 106. If errors are found in the solid geometry 106, then the solid geometry may be required to be refabricated, causing substantial delays and increased costs.

SUMMARY

A method for performing a thermal simulation of an additive manufacturing process. The method includes accessing a voxel model representing a representative system using one or more processors. The voxel model includes a first transition associated with a first group of one or more voxels transitioning between liquid and vapor, a second transition associated with a second group of one or more voxels transitioning between solid and liquid, a third transition associated with a third group of one or more voxels undergoing sinter, and a fourth transition associated with a fourth group of one or more voxels undergoing a solid state phase change. The method determines a flux imbalance metric based on a flux, a rate of change of the first transition, a rate of change of the second transition, a rate of change of the third transition, and a rate of change of the fourth transition. The method determines one or more temperatures for the representative system based on the flux imbalance metric.

DETAILED DESCRIPTION

In an additive manufacturing process, a laser beam operates with certain parameters such as power, scan speed, and beam size to melt the powder to form a melt pool. The variety of parameters that control this process can result in different melt pool sizes and shapes. For example, in high energy density cases, the laser heat source can vaporize the material and create a vapor cavity. The vaporized material can absorb the energy at a higher rate than the non-vaporized material. The increased absorption within a vapor cavity causes additional melting, further increasing the melt pool size and causes penetration into the material. This penetration, if not replenished by molten material, results in a cavity called a keyhole. The material used may be any suitable material and can include metallic and alloy materials. The embodiments herein, however, can be widely applied across materials is not limited to any particular material.

Figure 1:
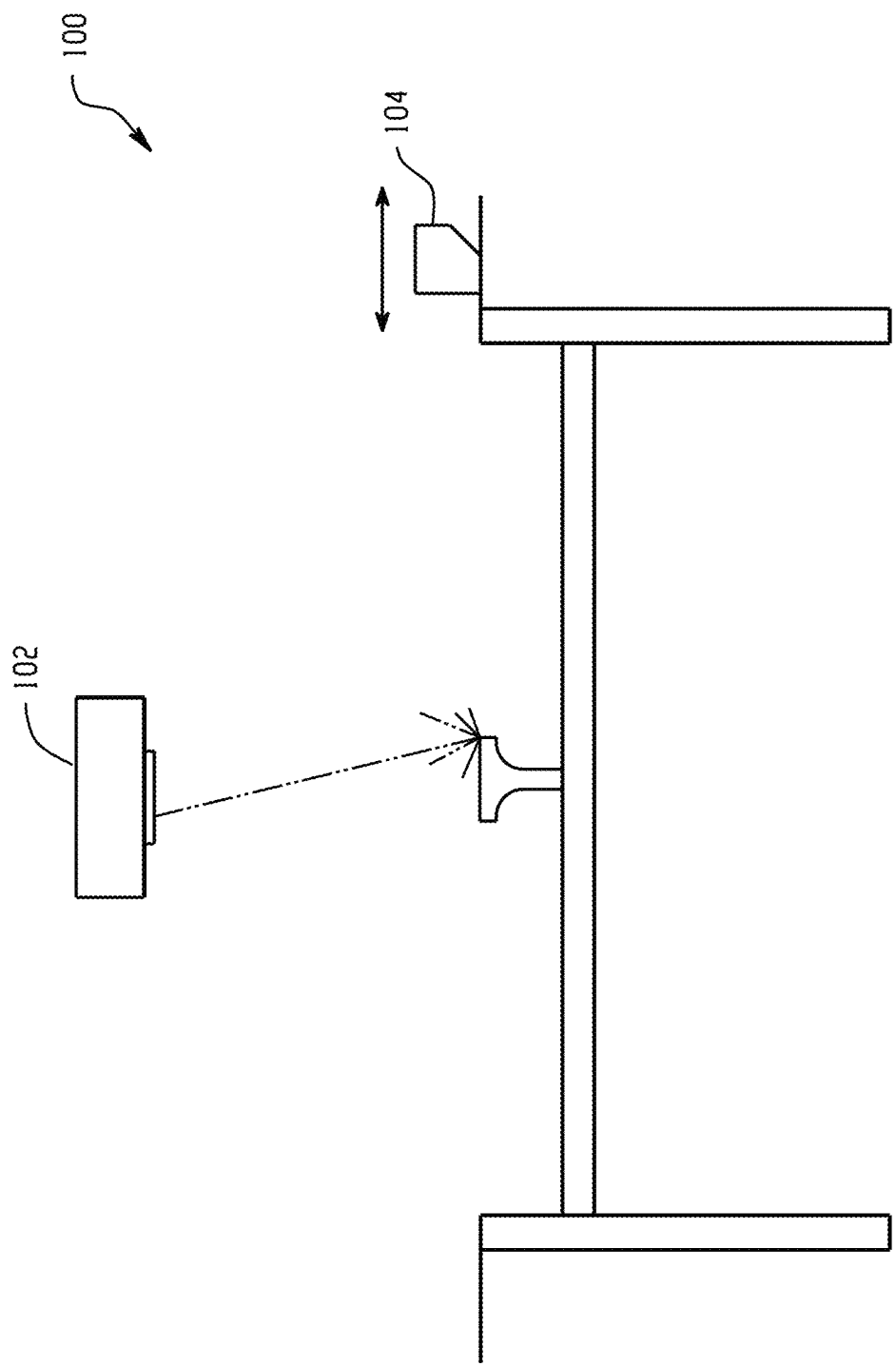
FIG. 1 is a diagram depicting an example additive manufacturing process.
Figure 2A:
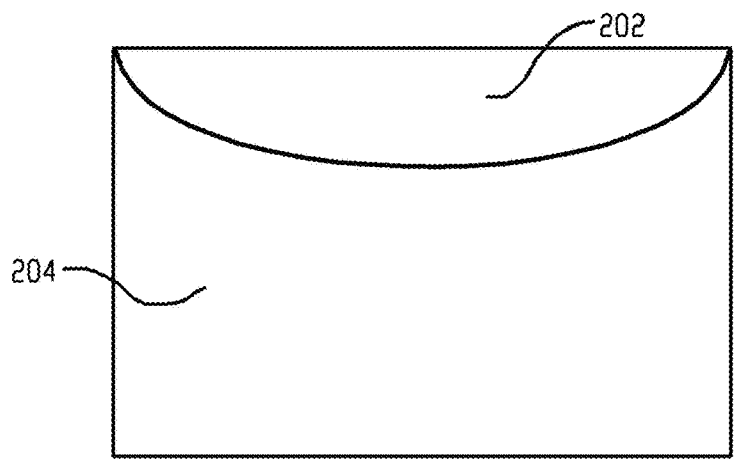
FIGS. 2A, 2B, and 2C are diagrams depicting various melt pool geometries.

Referring to first to FIG. 2A, this figure depicts an example melt pool geometry of an additive manufacturing process operating in conduction mode. The beam from a laser emitting device, such as 102 in FIG. 1, forms a melt pool 202 on the top of the base material 204 to fuse the next layer of the powder feedstock to the base material 204 and gradually build a solid geometry, such as 106 in FIG. 1, layer by layer. The melt pool 202 may also be referred to as the fusion zone. When the system is operating in conduction mode, the melt pool remains relatively shallow to allow the buildup of the solid geometry.

Figure 2B:
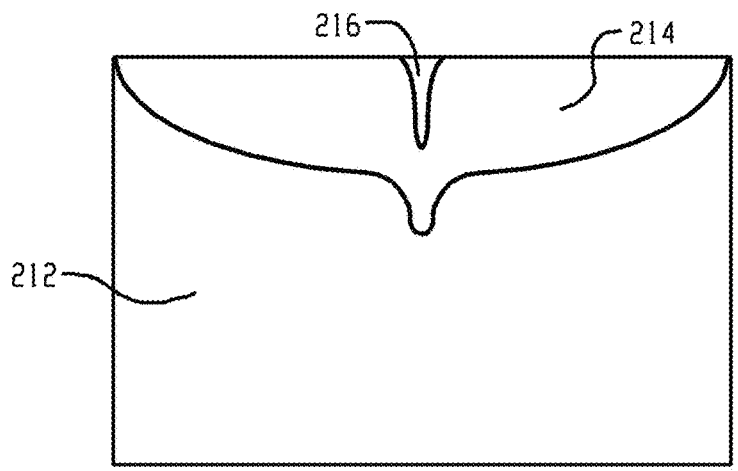

Referring to FIG. 2B, this figure depicts an example melt pool geometry of an additive manufacturing process operating in keyhole mode. Keyhole mode can occur when the melt pool 214 is exposed to high heat source intensity which can cause the melt pool to evaporate and create a vapor column 216 as part of the overall melt pool geometry. High heat source intensity can occur in situations such as high energy output from the laser emitting device, a narrow beam width to cause a more focused beam, a slow scan speed, i.e., where a particular area of the melt pool is exposed for additional time to the beam, and others. If the vapor column 216 is not properly accounted for, it can significantly affect the melt pool geometry due to an effect called inverse Bremsstrahlung. Inverse Bremsstrahlung occurs because the absorption coefficient of the vapor column 216 can be significantly higher than the absorption coefficient of the melt pool 214. This causes the vapor column 216 to experience increased heat absorption which can form a keyhole through the base deposition material 212. A positive feedback loop can then occur because the increased heat absorption of the vapor column can cause more of the melt pool to vaporize, thus creating a larger vapor column which can absorb more heat. An example of the effects of this positive feedback loop can be seen in FIG. 2C.

Figure 2C:
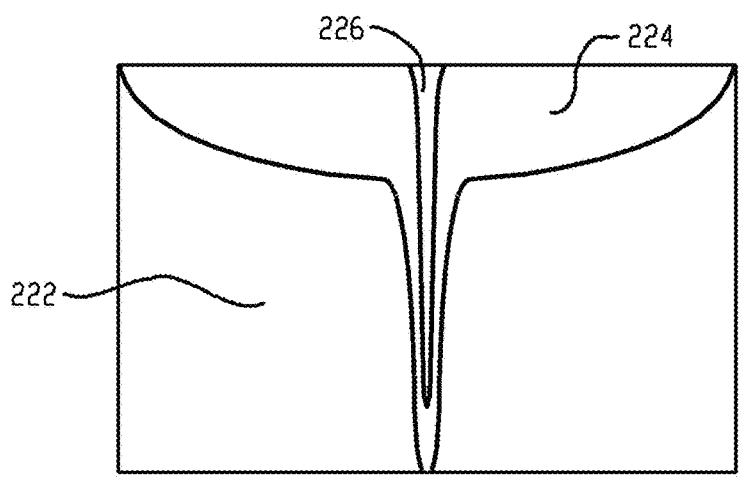

FIG. 2C depicts the melt pool geometry in keyhole mode with deep penetration through the base material. In FIG. 2C, the vapor column 226 has increased in depth causing a deeper keyhole through base material 222. In the additive manufacturing industry, keyholes are typically not preferred because they cause a reduction of base material and may cause a reduction of strength of the additive process component. Keyhole welding may be preferred, however, when the user wishes to create a reduction of material, such as a bore-hole through the component.

Figure 3:
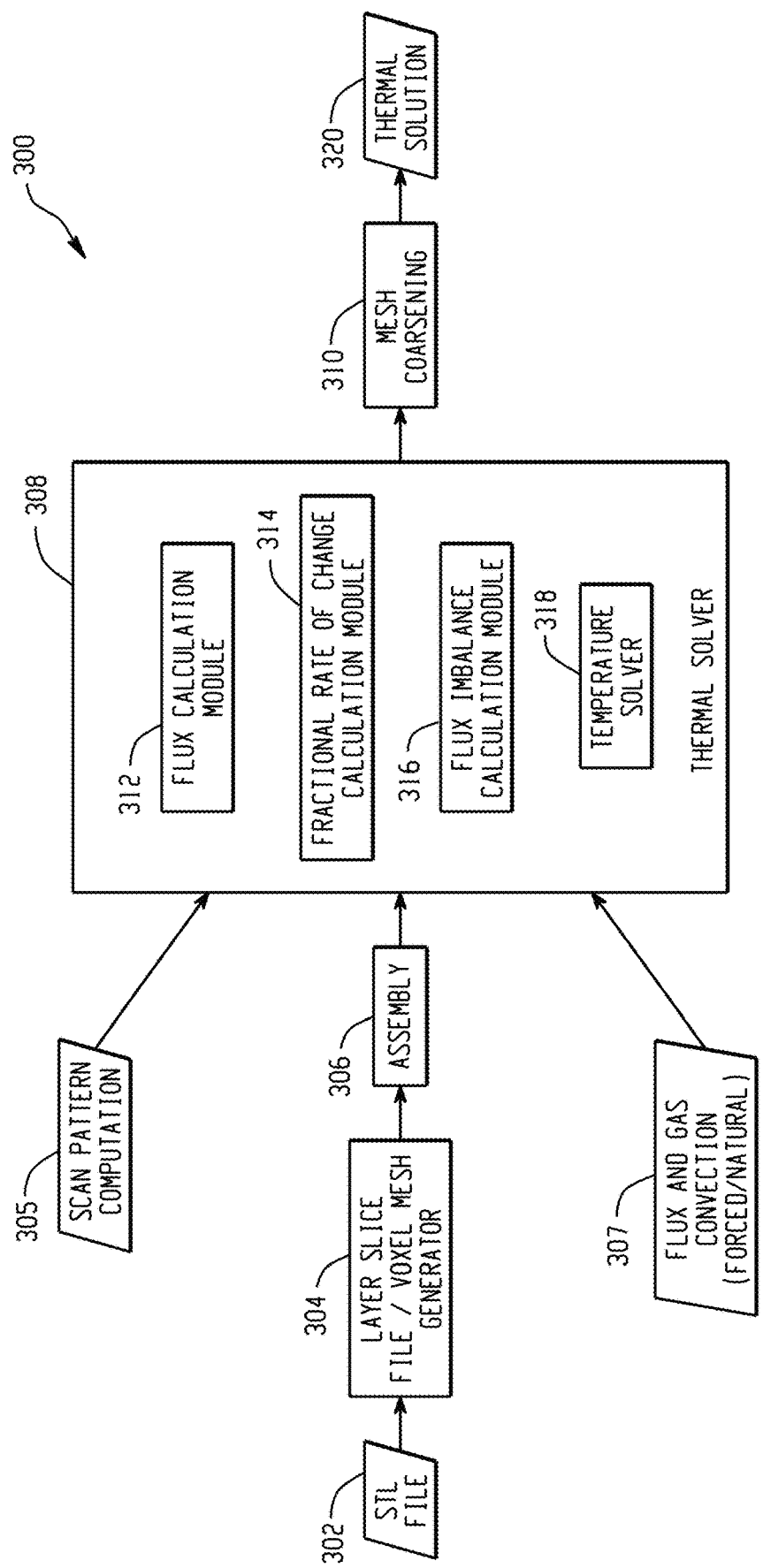
FIG. 3 is a block diagram of an example system for determining a thermal solution of an additive manufacturing process.

FIG. 3 is a diagram of an example system 300 for performing a thermal simulation of an additive manufacturing process to generate a thermal solution 320 for a three-dimensional (3D) geometry produced by the additive manufacturing process. The thermal solver 308 accounts for the effects of inverse Bremsstrahlung and can more accurately determine keyhole formation. The increased accuracy of the thermal solver 308 gives an improved thermal solution 320 to the user. The user can use the improved thermal solution 320 to make modifications to the initial design, such that the user can fabricate an additive manufacturing component as intended. The increased accuracy, thus, can remove the need for "trial-and-error" manufacturing where the user is required to fabricate the additive manufacturing component a second or more times after an abnormality was discovered during the initial fabrication.

The thermal solver 308 utilizes a flux calculation module 312, a fractional rate of change calculation module 314, a flux imbalance calculation module 316, and a temperature solver 318 to generate a fine spatial scale thermal model for the 3D geometry. The flux calculation module 312 can determine a flux with an estimated flux. The flux can also be determined as the amount of output from the laser emitting device. The fractional rate of change calculation module 314 can determine a fractional rate of change associated with each of material transitions. For example, the fractional rate of change calculation module 314 can determine a time rate of fractional change of the liquid into vapor for the voxels undergoing vaporization, the time rate of fractional change of a solid into a liquid for the voxels undergoing melting, a time rate of change of density from powder to solid at a solidus temperature with increasing temperature for voxels undergoing sinter, and a time rate of fractional change of the material undergoing a solid state phase change. The flux imbalance calculation module 316 can iteratively accumulate a flux imbalance between the flux and various metrics associated with the transitions of the material. The temperature solver 318 then uses the iteratively accumulated right hand side ("RHS") flux imbalance to determine one or more temperatures of the system at each time increment.

The system 300 depicted in FIG. 3 may, for example, generate a thermal solution 320 for a 3D model geometry to be produced by the LPBF additive manufacturing system 100 as shown in FIG. 1. The system 300 shown in FIG. 3 includes a layer slice file/voxel mesh generator 304, an assembly module 306, a thermal solver 308, and a mesh coarsening module 310 for data storage reduction, each of which may, for example, be implemented using software stored on one or more non-transitory computer-readable medium and executed by one or more processor.

The system 300 receives a computer-aided design file 302 (e.g., an "STL file" generated using stereolithograhy CAD software) that provides design details for the 3D geometry to be produced by the additive manufacturing process. The computer-aided design file 302 may, for example, provide a triangulated representation of the surface of the 3D geometry. The computer-aided design file 302 may be received from a user input to the system 300, from an input from another system (e.g., from a CAD system), or by other suitable means.

The computer-aided design file 302 is received by the layer slice file/voxel mesh generator 304, which generates a layer slice file and a voxel mesh file from the computer-aided design file 302. In the illustrated embodiment, the layer slice file generation and voxel mesh file generation operations are shown as performed by a single software module 304. It should be understood, however, that in embodiments, the layer slice file and the voxel mesh file may be generated by separate software modules.

The layer slice file is generated by breaking the 3D geometry from the computer-aided design file 302 into two dimensional (2D) sections (referred to as 2D slices). The 2D slices for the 3D geometry may be stored as subfiles and may include a planar intercept (2D contour) of the 3D geometry at a constant height from the base of the 3D model with or without support structures. Generally, the height at which the layer slice file is generated is an integral multiple of the layer thickness. The 2D contour may, for example, be generated using a ray tracing/winding number algorithm.

The voxel mesh file is created by voxelizing the 3D cuboidal powder bed to provide a uniform grid of elements. The contour included inside the 2D geometry file, which serves as the top layer for simulation as soon as the layer number is appended in the simulation 'for' loop, may be used for gradually switching the voxel states from powder to solid as the laser traverses and melts the powder inside and on the contour. The 2D geometry may also be used to switch voxel states after exposure, for example when an incompletely melted region solidifies during subsequent laser exposure on appending future layers in simulation. The 2D geometry and contours are utilized as a bounding box because the state tracking and laser exposure is only constrained to the (x,y) bounds contained therein.

The assembly module 306 receives the layer slice file and voxel mesh file and performs a finite element assembly to generate one or more data sets (e.g., matrices) that characterizes the ease of heat flow through the 3D powder bed with various states such as powder or solid. In one embodiment, the assembly module 306 may generate a global stiffness matrix for the 3D geometry using conventional methods. Stiffness, in its conventional sense, is a measure of resistance towards deformation. In finite elements, a computational domain is first discretized into smaller elements and then the thermal stiffness is computed using $\int B^T CB(\det J)\, dv$ for each element where the B matrix is used for mapping the Temperature at element nodes to Temperature gradients at the integration point, C is used for denoting the anisotropic element thermal conductivity, detJ is the determinant of the element Jacobian and is used for measuring the shape correction factor of a generalized shaped element with respect to a reference shape of a cubic Master element of dimensions $(-1,1)^3$ in x, y and z dimensions respectively, and dv is used for denoting a differential volume of the Master element mentioned herein. Following this step, the stiffness in each element is assembled to create a global stiffness matrix of the size: (degrees of freedom)x(degrees of freedom). The degrees of freedom in the case of a thermal solver equals the number of discretization points or nodes present in the system because temperature is a scalar physical quantity and doesn't require direction such as displacements in mutually orthogonal x, y and z directions.

In other embodiments, the assembly module 306 may instead generate temperature dependent thermal conductivity and heat capacity matrices using non-conventional methods. Due to the dynamic nature of the problem, two physical quantities of interest, namely the baseline thermal conductivity and heat capacity matrices, may be determined using tensor product architectures for unit scalar thermal conductivity, density and specific heat values. Appropriate amplification factors may then be applied to construct the temperature dependent thermal conductivity and heat capacity matrices with thermal non-linear and state (powder/liquid/solid) sensitivities.

The one or more heat flow matrices generated by the assembly module 306 are received by the thermal solver 308, along with scan pattern computation data 305 and flux and 'purging' gas convection data 307. The scan pattern computation 305 data includes information identifying the pattern (e.g., x, y and timing information of laser exposure) in which the laser in the additive manufacturing system under simulation will scan the top surface of the slice. The flux and gas convection data 307 includes information regarding the thermal flux and gas convection provided by the additive manufacturing system under simulation. For example, the flux information may identify the type of energy or heat pattern that is applied to the powder bed, such as a Gaussian, top-hat, stepped pattern or some other type of pattern. The gas convection information may identify the type of 'purging' gas (e.g., Argon gas or Nitrogen gas) and gas flow rate that is utilized by the additive manufacturing system under simulation.

The heat flow matrices or data sets received by the thermal solver 308 can comprise a voxel model representing a representative system that includes data regarding transitions of material between various states. For example, the data can relate to the material transitioning from a liquid to a vapor, from solid to liquid, undergoing sinter, and undergoing a solid state phase change.

A fine spatial scale thermal solution that is generated by the thermal solver 308 (for example using the methods depicted in FIGS. 4 and 5) may be passed to a mesh coarsening module 310 in order to decrease the size of the output file size, producing the thermal solution 320. In embodiments, the thermal solution 320 output may also be stored as a sparse binary file. As the spatial node in the computational domain is situated at distances increasingly further away from the point of exposure by the heat source (e.g., laser), the mesh coarsening module 310 may coarsen the mesh away from the heat source with a grid spacing larger than the grid spacing near the heat source, for example using a Far Region Multiplier (FRM) grid coarsening technique. In this manner, the output temperature field of the thermal model may be coarsened using a fine length scale near the heat source and a coarse length scale away from the heat source. This scaling should be performed such that Jacobian sensitivities are met while outputting interpolated or node-on-node temperatures while upscaling the field.

Figure 4:
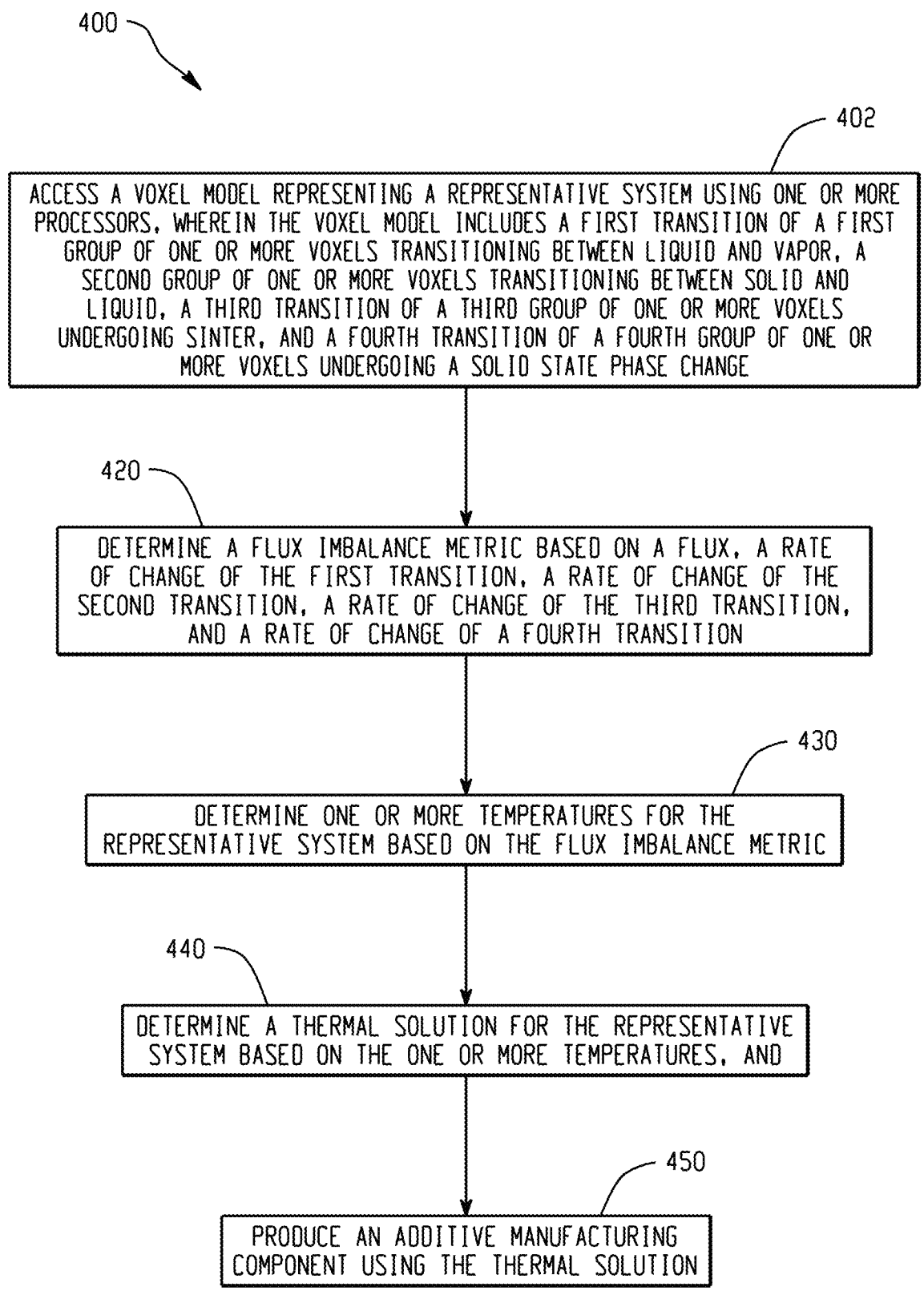
FIG. 4 is a block diagram of an example embodiment of producing an additive manufacturing component using the thermal solution.
Figure 5:
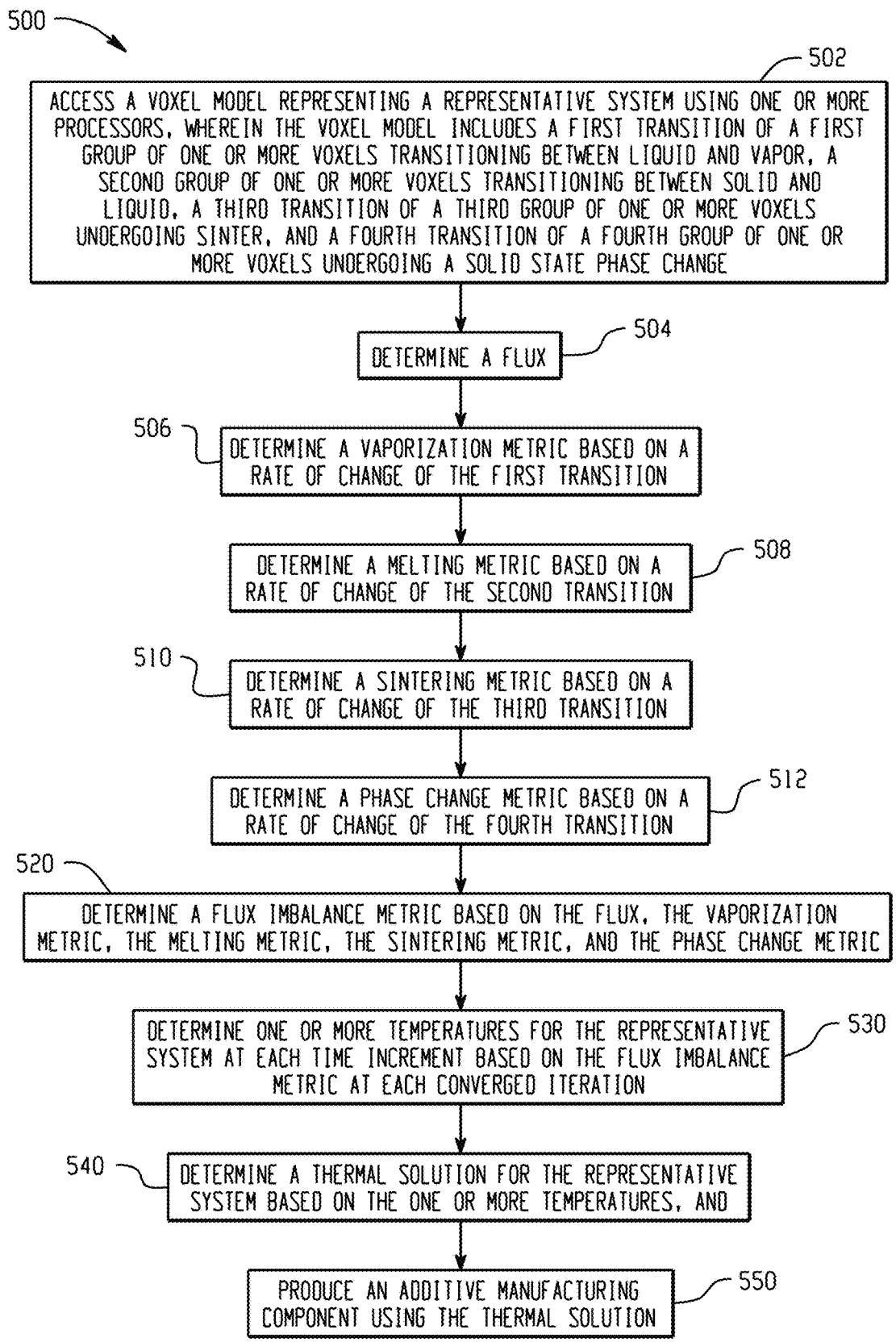
FIG. 5 is a block diagram depicting another example embodiment of producing an additive manufacturing component using the thermal solution.

FIGS. 4 and 5 depict example methods that may be used by the thermal solver 308 to generate the fine spatial scale thermal solution for the 3D geometry. Advantageously, the use of the methods depicted in FIGS. 4 and 5 may require less time and computational resources and produce a result with increased accuracy compared to conventional methods.

FIG. 4 is a flow diagram of an example method 400 for determining one or more temperatures for the representative system based on the flux imbalance metric 430. In step 402, one or more processors access a voxel model representing a representative system. The voxel model includes a first transition of a first group of one or more voxels transitioning from liquid to vapor, a second transition of a second group of one or more voxels transitioning from solid to liquid, a third transition of a third group of one or more voxels undergoing sinter, and a fourth transition of a fourth group of one or more voxels undergoing a solid state phase change. In step 420, a flux imbalance metric is determined based on a flux, a rate of change of the first transition, a rate of change of the second transition, a rate of change of the third transition and a rate of change of the fourth transition. In step 430, one or more temperatures are determined for the representative system based on the flux imbalance metric. In step 440, a thermal solution for the representative system is optionally determined based on the one or more temperatures. In step 450, an additive manufacturing component is optionally produced using the thermal solution.

FIG. 5 is a flow diagram of an example method 500 for determining one or more temperatures for the representative system based on the flux imbalance metric 530. In step 502, one or more processors access a voxel model representing a representative system. The voxel model includes a first transition of a first group of one or more voxels transitioning from liquid to vapor, a second transition of a second group of one or more voxels transitioning from solid to liquid, a third transition of a third group of one or more voxels undergoing sinter, and a fourth transition of a fourth group of one or more voxels undergoing a solid state phase change. In step 504, a flux is determined. The flux can be estimated or determined from the output of the laser emitting device.

In step 506, a vaporization metric is determined based on a rate of change of the first transition. The rate of change of the first transition can be the time rate of fractional change of liquid into vapor for voxels undergoing vaporization. In step 508, a melting metric is determined based on a rate of change of the second transition. The rate of change of the second transition can be the time rate of fractional change of solid into liquid for the voxels undergoing melting. In step 510 a sintering metric is determined based on a rate of change of the third transition. The rate of change of the third transition can be the time rate of change of density from powder to solid at solidus temperature for voxels undergoing sinter. In step 512, a phase change metric is determined based on a rate of change of the fourth transition. The rate of change of the fourth transition can be the time rate of fractional solid state phase change. In step 520, the flux imbalance metric is determined based on the flux, the vaporization metric, the melting metric, the sintering metric, and the phase change metric, or any combination thereof. In step 530, one or more temperatures for the representative system is determined at each time increment based on the flux imbalance metric at each converged iteration. In step 540, a thermal solution is optionally determined for the representative system based on the one or more temperatures. In step 550, an additive manufacturing component is optionally produced using the thermal solution.

An embodiment of the current invention includes various concepts related to additive manufacturing. The embodiment includes an energy term due to the change in density from powder to solid as a result sintering. The embodiment can include the latent heats of fusion, vaporization, and equilibrium/metastable phase changes as energy terms. The embodiment can incorporate inverse Bremsstrahlung to help determine keyhole formation. The loss of heat via metal plasma mode increases its temperature in a particular manner and may be uniform. The embodiment also incorporates the use of non-linear thermophysical properties, for example, density and specific heat, which can be derived from equilibrium or Schiel computer coupling of phase diagrams and thermochemistry along with multi-component nonequilibrium corrections. The embodiment also incorporates the variable absorption in the vapor column and the rest of the top surface based on the state and can incorporate the effect of the mean curvature of the droplet to Stefan's conditions along with latent heat.

As a non-limiting example, the embodiment includes a thermal formulation:

$$KT + \rho C \dot{T} =$$
$$f - \rho L_V \left(\frac{df}{dt}\right)_{L \to V} - \rho L_f \left(\frac{df}{dt}\right)_{S \to L} - C_p T_{solidus} \left(\frac{d\rho}{dt}\right)_{p \to s} - \rho L_{pc} \left(\frac{df}{dt}\right)_{pc}$$

where $$\left(\frac{df}{dt}\right)_{L \to V}$$

indicates the time rate or fractional change of liquid into vapor for those voxels undergoing vaporization, $$\left(\frac{df}{dt}\right)_{S \to L}$$

indicates the time rate or fractional change of solid into liquid for those voxels undergoing melting, $$\left(\frac{d\rho}{dt}\right)_{p \to s}$$

indicates the time rate of change of density from powder to solid at solidus temperature for voxels undergoing sinter, and $$\left(\frac{df}{dt}\right)_{pc}$$

indicates the time rate of fractional change for voxels undergoing a solid state phase change. $f$ indicates the flux. $\rho$ indicates density. $L_v$ indicates the latent heat of vaporization. $L_v$ indicates the latent heat of fusion. $C_p$ indicates the heat capacity of the powder. $T_{solidus}$ indicates the solidus temperature of the solid. $L_{pc}$ indicates the latent heat of the solid state change.

To apply the concepts of inverse Bremsstrahlung, the thermal conductivity can be contained to a factor of 1000 beyond the vaporization temperature and can be expressed as:

$$k(T) = \begin{cases} 1000 k_{vap} & \forall T \geq T_{vap} \\ k(T) & \forall T < T_{vap} \end{cases}$$

Further, the flux absorption rate can be made as a function of the state of the material as:

$$f = f \operatorname{sgn}(1 + \operatorname{sgn}(T - T_{vap})) + A_s f \operatorname{sgn}$$
$$(1 + \operatorname{sgn}(T_{vap} - T)\operatorname{sgn}(state) + A_p f \operatorname{sgn}(1 + \operatorname{sgn}(T_{vap} - T))\operatorname{sgn}(1 - state)$$

The flux f can be multiplied with a factor of 1 for the laser absorbing voxels which are undergoing vaporization, followed by addition of flux multiplied by the solid absorptivity for powder converted to bulk solid and liquid (liquid has been modeled as solid with different properties for Finite Element Implementation) in conjunction with the addition of flux multiplied by the powder bed absorptivity.

The temperature of the vapor pool then can increase uniformly over the vaporization temperature as a function of the latent heats of fusion and vaporization as indicated as:

$$\rho_v(C_p)_v(T-T_v) = \rho_v L_v \Delta f_v + \rho_f L_f \Delta f_f$$

Figure 6:
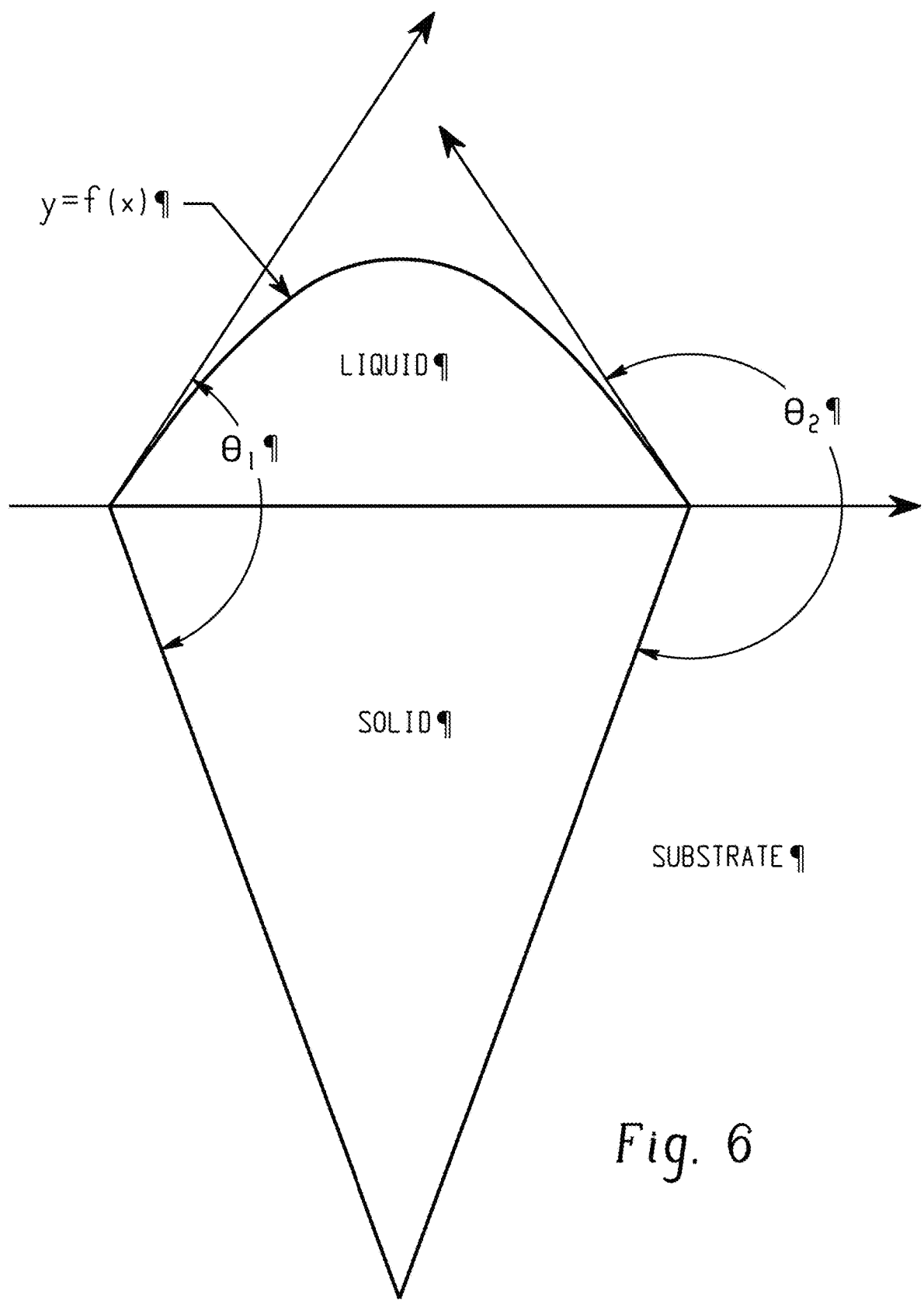
FIG. 6 is a diagram depicting a melt pool geometry.

In another embodiment, the thermal formulation can incorporate Stefan's conditions for the boundaries of the melt pool shown in, for example, FIG. 6. FIG. 6 depicts an example melt pool geometry present in an additive manufacturing process. In this embodiment the melt pool solidifies to form a solid defined by the area bounded by the cone and the upper meniscus. The upper meniscus forms the boundary between the solid and the liquid. The cone forms the boundary between the solid and the substrate. The melt pool energies from each interface can then be determined as the energy from the drop-liquid interface ($E_1$) (secant energy), solid-substrate interface ($E_2$) and the liquid-substrate interface ($E_3$). The inner angle between the upper meniscus and the solid-substrate boundary is defined as $\theta_1$. The angle between the solid and liquid boundary and the liquid-substrate boundary is defined as $\theta_2$. The melt pool energies can then be written as:

$$E_1 = \int_{l_1}^{l_2} \gamma (1 + f_x^2)^{1/2} dx \quad (1)$$

$$E_2 = \gamma_1 (l_2 - l_1) \cos(\theta_1 + \theta_2 - \pi) \quad (2)$$

$$E_3 = \gamma_2 (l - (l_2 - l_1)) \quad (3)$$

$$E = w(E_1 + E_2 + E_3) \quad (4)$$

where $\gamma_1$, denotes the solid-substrate and $\gamma_2$ denotes the liquid-substrate surface energy per unit area respectively.

Melt pool volumes are determined using a multiplication between infinitesimal length (w) and the area under the drop-liquid interface ($V_1$) and solid-substrate interface ($V_2$).

$$V_1 = w \int_{l_1}^{l_2} f(x) dx \quad (5)$$

$$V_2 = \frac{1}{4} w (l_2 - l_1)^2 \sin(\theta_1 + \theta_2) \quad (6)$$

The total volume of the melt pool is provided by adding equations (5) and (6) leading to equation (8):

$$V = V_1 + V_2 \quad (7)$$

$$V = w\left(\int_{l_1}^{l_2} f(x)dx + \frac{1}{4}(l_2 - l_1)^2 \sin(\theta_1 + \theta_2)\right) \quad (8)$$

The Lagrange multiplier ($\lambda$) has been introduced to carry out melt pool energy optimization using the calculus of variations method.

$$E' = E + \lambda w \int_{l_1}^{l_2} f(x)dx \quad (9)$$

$$E'_1 = w \int_{l_1}^{l_2} \left(\gamma(1 + f_x^2)^{1/2} + \lambda f(x)\right) dx \quad (10)$$

$$E'_2 = w(\gamma_2(l - (l_2 - l_1))) \quad (11)$$

$$E'_3 = -w(\gamma_1(l_2 - l_1)\cos(\theta_1 + \theta_2)) \quad (12)$$

Performing the calculus of variations, the variational form of the first part of the $E'_1$; as $w^{-1} \delta E'_{11}$, and is computed in equation (13):

$$w^{-1}\delta E'_{11} = \int_{l_1}^{l_2} \left(\frac{1}{2}\frac{\gamma(2f_x)\delta(f_x)}{(f_x^2 + 1)^{1/2}} + \lambda \delta(f(x))\right) dx \quad (13)$$

Simplifying the equation becomes:

$$w^{-1}\delta E'_{11} = \int_{l_1}^{l_2} \left(\frac{\gamma f_x \delta(f_x)}{(1 + f_x^2)^{1/2}} + \lambda \delta(f(x))\right) dx \quad (14)$$

$$w^{-1}\delta E'_{12} = \left(\gamma(1 + f_x^2)^{1/2} + \lambda f(x)\right)|_{l_2} \delta l_2 \quad (15)$$

$$w^{-1}\delta E'_{13} = -\left(\gamma(1 + f_x^2)^{1/2} + \lambda f(x)\right)|_{l_1} \delta l_1 \quad (16)$$

The variational forms by grouping similar terms of $E'_2$ and $E'_3$ are provided in equations (17) and (18).

$$w^{-1}\delta E'_{mod2} = (\gamma_2 + \gamma_1 \cos(\theta_1 + \theta_2))\delta l_2 \quad (17)$$

$$w^{-1}dE'_{mod3} = (\gamma_1 \cos(\theta_1 + \theta_2) + \gamma_2)\delta l_1 \quad (18)$$

In addition, $\delta(f_x)$ could be further simplified to:

$$\delta f_x = (\delta f)_x \quad (19)$$

Based on equation (19), the first part of equation (14) could be further simplified to equation (20) and an integration by parts can be carried further:

$$w^{-1}\delta E'^{1}_{111} = \int_{l_1}^{l_2} \frac{\gamma f_x (\delta f)_x}{(1 + f_x^2)^{1/2}} \quad (20)$$

Integration by parts for two variables u and v can be carried out as shown in equation (21):

$$\int_a^b u\,dv = uv\big|_a^b - \int_a^b v\,du \quad (21)$$

Considering, $$u = \frac{\gamma f_x}{(1 + f_x^2)^{1/2}} \quad (22)$$

$$dv = (\delta f)_x$$

$$du = \gamma\left(\frac{f_x}{(1 + f_x^2)^{1/2}}\right)_x$$

$$v = \delta f$$

Further integration, provides as follows:

$$\int_{l_1}^{l_2} \frac{\gamma f_x (\delta f)_x}{(1 + f_x^2)^{1/2}} dx = \frac{\gamma f_x \delta f}{(1 + f_x^2)^{1/2}}\bigg|_{l_1}^{l_2} - \gamma \int_{l_1}^{l_2} \left(\frac{f_x}{(1 + f_x^2)^{1/2}}\right)_x \delta f \, dx \quad (23)$$

Also, since variation in f and l are in opposite direction, the equation becomes:

$$\delta f|_{l_2} = -f_x \delta l|_{l_2} \quad (24)$$

and $$\delta f|_{l_1} = -f_x \delta l|_{l_1} \quad (25)$$

$$\int_{l}^{l/2} \frac{\gamma f_x^2 (\delta f)_x}{(1 + f_x^2)^{1/2}} dx = -\frac{\gamma f_x^2 \delta l}{(1 + f_x^2)^{1/2}}\bigg|_{l_1}^{l_2} - \gamma \int_{l_1}^{l_2} \left(\frac{f_x}{(1 + f_x^2)^{1/2}}\right)_x \delta f \, dx \quad (26)$$

After inserting equation (26) in equation (14), the equation becomes:

$$w^{-1}\delta E'_{11} = \int_{l_1}^{l_2} \left(-\gamma\left(\frac{f_x}{(1 + f_x^2)^{1/2}}\right)_x + \lambda\right) \delta(f(x)) dx \quad (27)$$

After inserting equation (26) in equations (15)+(17), the equation becomes:

$$w^{-1}\delta E'_{12} + w^{-1}\delta E'_{mod2} = \left(\gamma(1 + f_x^2)^{1/2}\right) + \lambda f(x) - (\gamma_2 + \gamma_1 \cos(\theta_1 + \theta_2))) \quad (28)$$

$$\delta l_2 - \frac{\gamma f_x^2 \delta l_2}{(1 + f_x^2)^{1/2}}$$

which further simplifies to equation (29):

$$w^1 \delta E'_{12} + w^{-1}\delta E'_{mod2} = \left(\frac{\gamma}{(1 + f_x^2)^{1/2}} + \lambda f(x) - (\gamma_2 + \gamma_1 \cos(\theta_1 + \theta_2))\right) \delta l_2 \quad (29)$$

Similarly, after inserting equation (26) in equations (16)+(18), the equation becomes:

$$w^1 \delta E'_{13} + w^{-1}\delta E'_{mod3} = \quad (30)$$

$$\left(-\gamma(1 + f_x^2)^{1/2} - \lambda f(x) + (\gamma_1 \cos(\theta_1 + \theta_2) + \gamma_2)\right)\delta l_1 + \frac{\gamma f_x^2 \delta l_1}{(1 + f_x^2)^{1/2}}$$

which further simplifies to equation (31):

$$w^{-1}\delta E'_{13} + w^{-1}\delta E'_{mod3} = -\left(\frac{\gamma}{(1+f_x^2)^{1/2}} + \lambda f(x) - (\gamma_2 + \gamma_1 \cos(\theta_1 + \theta_2))\right)\delta l_1 \quad (31)$$

Considering first variations in which endpoints are fixed, the equation becomes $\delta l_1 = \delta l_2 = 0$ and then the Lagrange multiplier $\lambda$ could be determined by making the 'integral' coefficient of $\delta (\int f(x))dx$ zero as illustrated in equation (32) leading to equation (33-37).

$$-\gamma\left(\frac{f_x}{(1+f_x^2)^{1/2}}\right)_x + \lambda = 0 \quad (32)$$

$$\lambda = \gamma\left(\frac{f_x}{(1+f_x^2)^{1/2}}\right)_x \quad (33)$$

$$\lambda = \gamma\left(f_x(1+f_x^2)^{-1/2}\right)_x \quad (34)$$

$$\lambda = \gamma\left(f_{xx}(1+f_x^2)^{-1/2} + f_x\left(-\frac{1}{2}\right)(1+f_x^2)^{-\frac{3}{2}}(2f_xf_{xx})\right) \quad (35)$$

$$\lambda = \gamma\left(\frac{f_{xx}(1+f_x^2) - f_x^2 f_{xx}}{(1+f_x^2)^{3/2}}\right) \quad (36)$$

Simplifying, the equation becomes:

$$\lambda = \gamma \frac{f_{xx}}{(1+f_x^2)^{3/2}} \quad (37)$$

Assuming, $$2F = \frac{f_{xx}}{(1+f_x^2)^{3/2}},$$

equation (37) could be further written as:

$$\lambda = 2F\gamma \quad (38)$$

If $F<0$, a solid dendrite extends into the liquid if $f$ is assumed an arc of a circle in 2 dimensions, which yields practical results.

By applying the first Maxwell's relation of Thermodynamics, the equation becomes:

$$\left(\frac{\partial T}{\partial V}\right)_S = -\left(\frac{\partial P}{\partial S}\right)_V \quad (39)$$

Where $$\Delta s|_v = \frac{(L_f)_v}{T_m}$$

and $(L_f)_v$ denotes the latent heat of fusion at constant volume and $T_m$ denotes the liquidus temperature for alloys and melting temperature for pure metals. Further, the undercooling could be provided in the form $\Delta T = T^{s-L} - T_m$ equation becomes:

$$\lambda = \frac{(L_f)_v}{T_m}\Delta T \quad (40)$$

By using the definition in (38), the equation becomes:

$$\frac{(L_f)_v}{T_m}\Delta T = 2F\gamma \quad (41)$$

Therefore, $$T^{s-L} = T_m\left(1 + \frac{2F\gamma}{(L_f)_v}\right) \quad (42)$$

Considering the next set of variations where the endpoints are eligible of moving and by equating the coefficients of $\delta l_2$ and $\delta l_1$ to zero, the equation becomes:

$$\gamma(1+f_x^2)^{-1/2} - (\gamma_1 + \gamma_2 \cos(\theta_1 + \theta_2)) = 1 \quad (43)$$

Equation (43) can be arranged into equation (44):

$$\gamma(1+f_x^2)^{-1/2} = \gamma_1 + \gamma_2 \cos(\theta_1 + \theta_2) \quad (44)$$

$$\gamma \cos(\pi - \theta_2) = \gamma_1 + \gamma_2 \cos(\theta_1 + \theta_2) \quad (45)$$

$$-\gamma \cos(\theta_2) = \gamma_1 + \gamma_2 \cos(\theta_1 + \theta_2) \quad (46)$$

It should be noted that $\theta_2$ is an obtuse angle and therefore the $\gamma$ would be positive as in general as $\gamma_1 > \gamma_2$ and in general $$\pi < \theta_1 + \theta_2 < \frac{3\pi}{2}.$$

The Stefan's condition could be further corrected as follows:

$$(\rho_s(L_f)_v + 2F\gamma)v_n = (k_T^s \nabla T^s - k_T^l \nabla T^l) \cdot \hat{n} \quad (47)$$

The combined effects of using the melt pool energies in this embodiment means that the thermal formulation can be further refined to be:

$$KT + \rho C\dot{T} = f - \rho L_V\left(\frac{df}{dt}\right)_{L \to V} -$$
$$(\rho L_f + 2F\gamma)\left(\frac{df}{dt}\right)_{S \to L} - C_p T_{solidus}\left(\frac{d\rho}{dt}\right)_{p \to s} - \rho L_{pc}\left(\frac{df}{dt}\right)_{pc}$$

Figure 7:
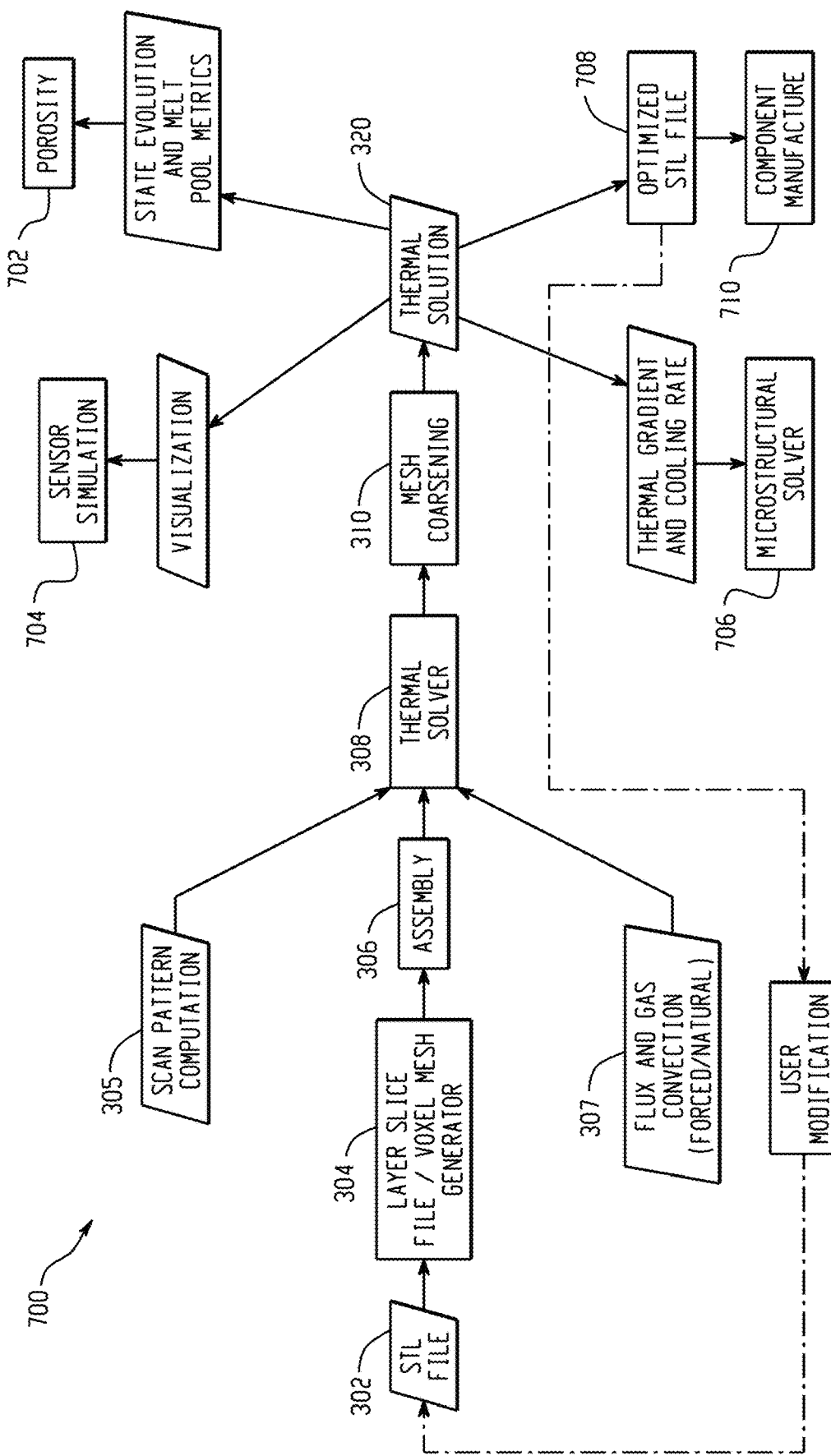
FIG. 7 is a flow diagram of an example method for producing an additive manufacturing component using the thermal solution.

FIG. 7 depicts another system diagram 700 that illustrates several example applications for the thermal solution 320 generated by the system 300 of FIG. 3. The illustrated examples include a porosity simulation 702, a sensor simulation 704, a structural solver 706, and a component manufacture 710. It should be understood that the examples illustrated in FIG. 7 are intended to be non-limiting, and that the thermal solution 320 generated by the system of FIG. 3 may also be utilized in many other applications.

In the porosity simulation 702, state evolution and melt pool metrics may be extracted from the thermal solution 320 to simulate the porosity of the 3D geometry. The state evolution and melt pool metrics may be used to simulate which portions of each layer will melt and solidify during the additive manufacturing process. Porosity may be determined based on the percentage of each layer inside the 2D contour at each layer that has not melted. The porosity simulator 702 may, for example, also be used to determine if un-melted powder within a layer contour will become melted over time during the additive manufacturing process (e.g., during application of the next layer), or whether the un-melted powder may become trapped within the geometry.

The sensor simulator 704 may be used to simulate one or more virtual sensors to track and display one or more parameters of the additive manufacturing process. For example, the thermal solution 320 may be used to extract information to visualize one or more parameters using intelligent triangulation and industry standard sensor features, such as a stationary full thermal sensor, a coaxial full thermal sensor or a coaxial average sensor. As one example, the sensor simulator 704 may be used to simulate and visualize the temperature at a given point or radius during the additive manufacturing process.

The structural solver 706 may utilize the thermal solution 320 to identify thermal strain within the 3D geometry and simulate distortion (such as shrinkage) within the 3D geometry that is caused by the thermal strain. In one embodiment, a thermal solution includes a thermal response or temperature field represented at finite element nodes of a dimensional computational domain, which is solved by prescribing Dirichlet (Temperature) and Neumann (Flux) boundary conditions. In one example, a thermal solution is solved by fixing appropriate thermal and laser flux boundary conditions at a bottom of a base plate (e.g., at 353 K, 80° C., a manufacturer recommended or implemented temperature) and on the top of a current 2D slice under processing, respectively. These two sets of boundary conditions are, in one embodiment, further appended with convection and radiation conditions. In one example, top surface convection is activated for current solutions, but in other implementations, any and all combinations can be configurably adjusted on or off.

The component manufacture 710 may utilize the thermal solution 320 to produce an additive manufacture component. The thermal solution 320 can be used to create an optimized STL file 708. The optimized STL file 708 can then be used with an additive manufacturing machine for component manufacture 710. Alternatively, the optimized STL file can provide feedback to the user regarding the temperatures and behavior of a work piece in the additive manufacturing before the component is manufactured. The user can use this information to make a user modification 712, such as by changing laser parameters or work piece specifications. The new STL file can then be input into the system again at STL file 302 and a new thermal solution 320 can be solved based on the user modification 712.

Figure 8B:
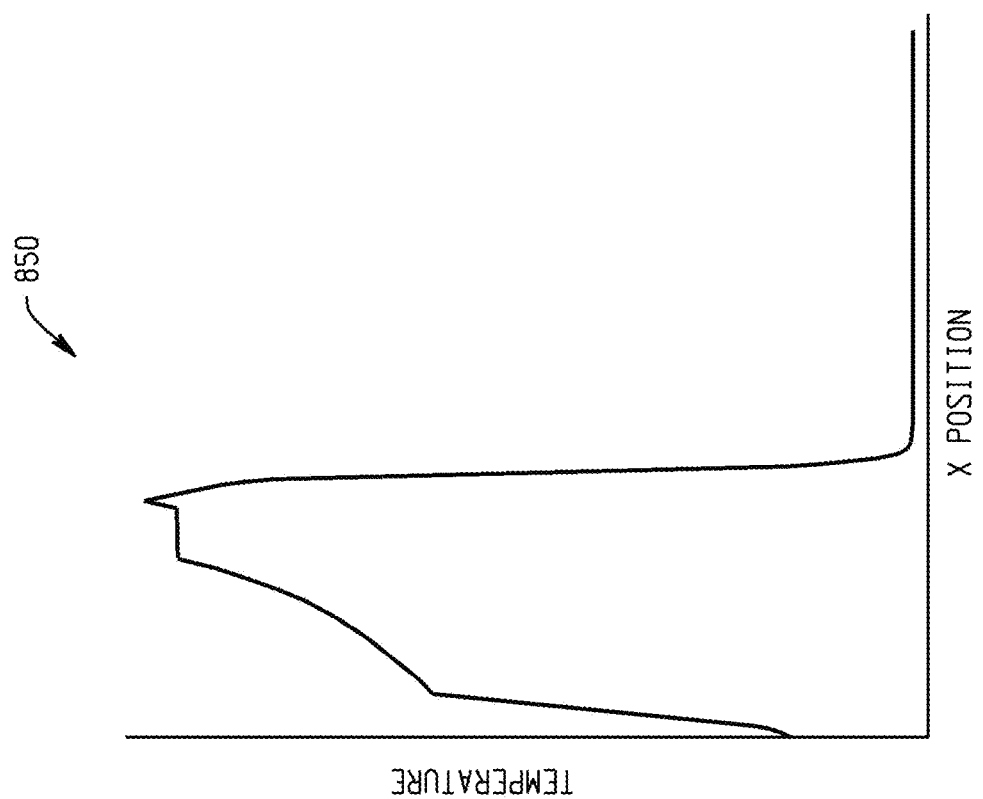
FIGS. 8A and 8B are diagrams illustrating the melt pool temperature gradient and melt pool temperature profile of an additive manufacturing component, respectively.
Figure 8A:
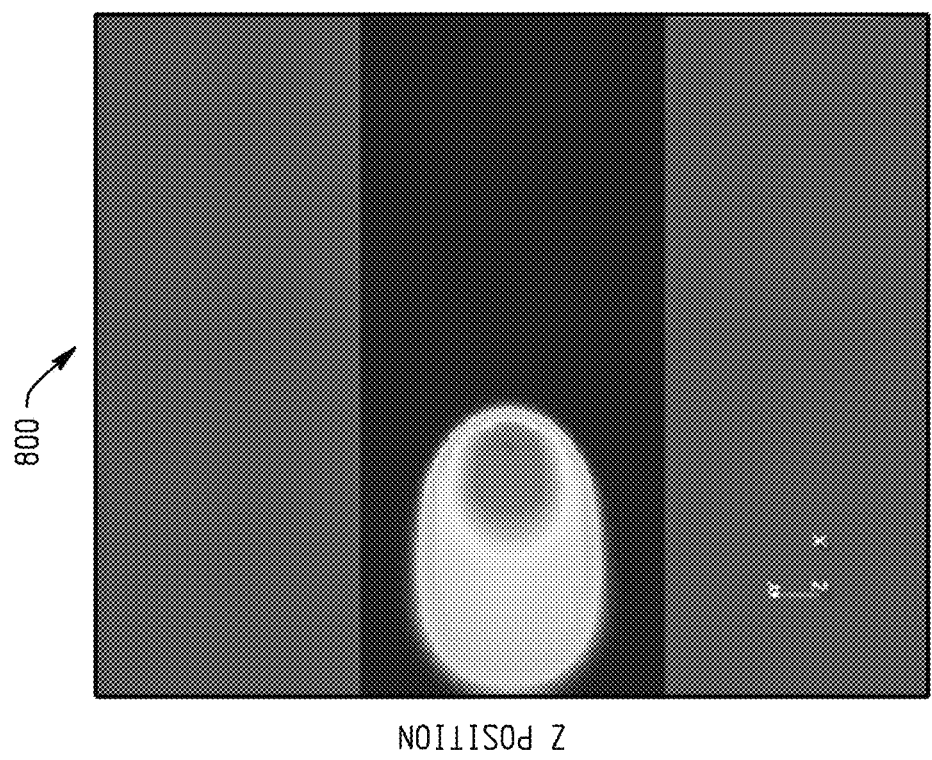
Figure 9:
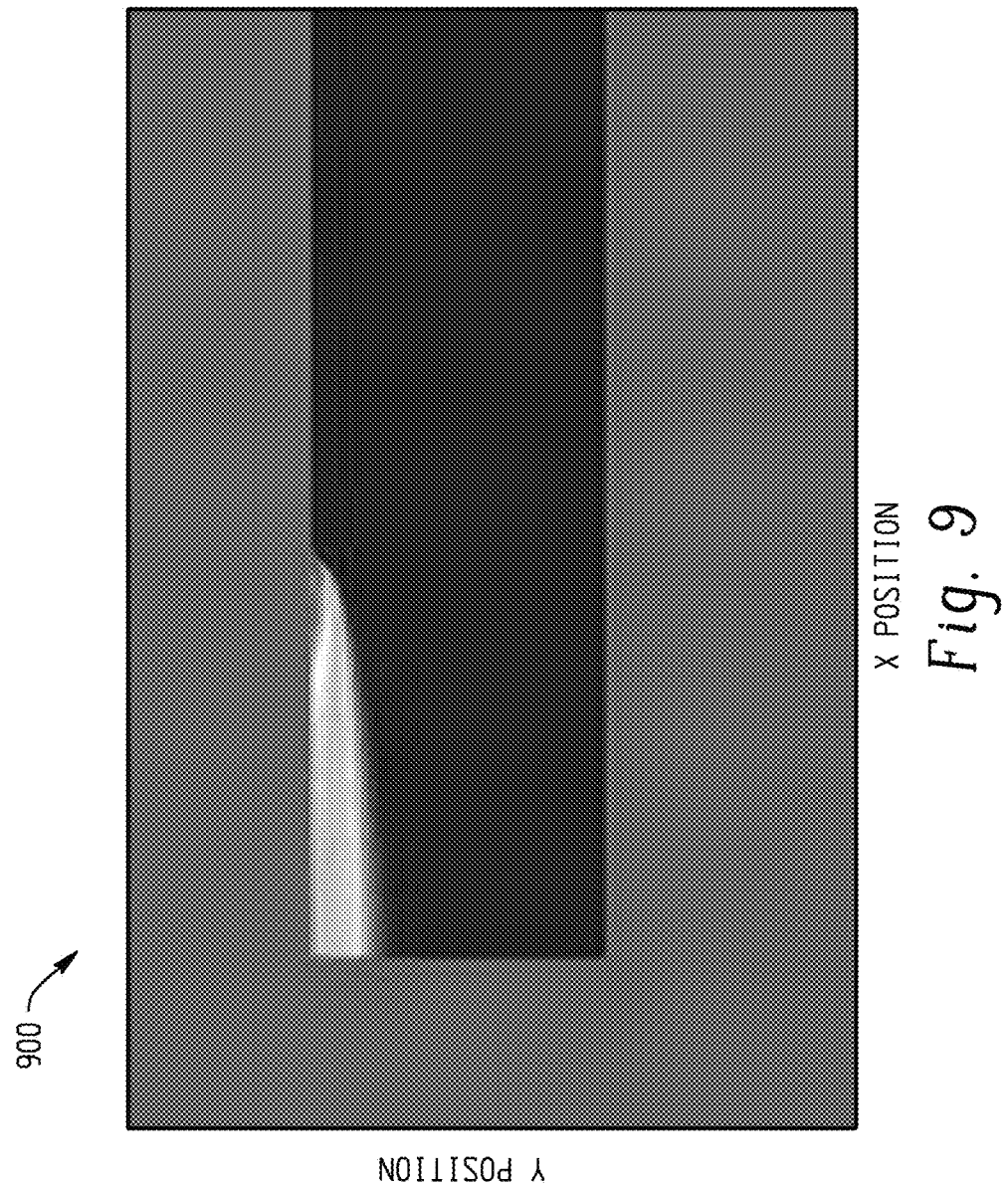
FIG. 9 is a side-view diagram illustrating the melt pool temperature gradient of an additive manufacturing component.

FIG. 8A, is a top-down diagram illustrating an example melt pool temperature gradient 800 of an additive manufacturing component. The melt pool temperature gradient 800 is an example output from the sensor simulator 704 in FIG. 7 that can be used to visualize a thermal solution. In this example the laser has moved translationally along the x-axis from left to right. The relative temperature for the material becomes hotter from left to right until the location being targeted by the beam. The temperature then decreases for the area where the laser has not yet traversed. This simulation is also shown in FIG. 8B as a diagram illustrating an example melt pool temperature profile 850 of an additive manufacturing component. The temperature increases at a rapid rate until the liquidus to solidus transition with undercooling occurs. Then the temperature continues to increase but at a slower rate until the vapor temperature transition where the temperature remains relatively constant. This is where the vapor absorbs the laser energy and keyholes can be created assisted by inverse Bremsstrahlung. There is then a slight increase due to the powder hump before the temperature declines. FIG. 9 is a side-view diagram illustrating an example melt pool temperature gradient 900 of the additive manufacturing process. In a similar manner as FIGS. 8A-8B, the temperature increases until the location of the laser and then decreases.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, or Python for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Systems and methods as described herein may be performed by a simulator, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the behavior of the one or more objects in the region of interest, the behavior of radar waves approximated by one or more rays transmitted in the simulation). The models represent behaviors of the system, while the simulation represents the operation of the system over time. In one example, one or more physical objects is fabricated based at least in part on simulations performed as described herein.

The methods and systems described herein may be implemented using any suitable processing system with any suitable combination of hardware, software and/or firmware, such as described below with reference to the non-limiting examples of FIGS. 10, 11A, 11B and 11C.

Figure 10:
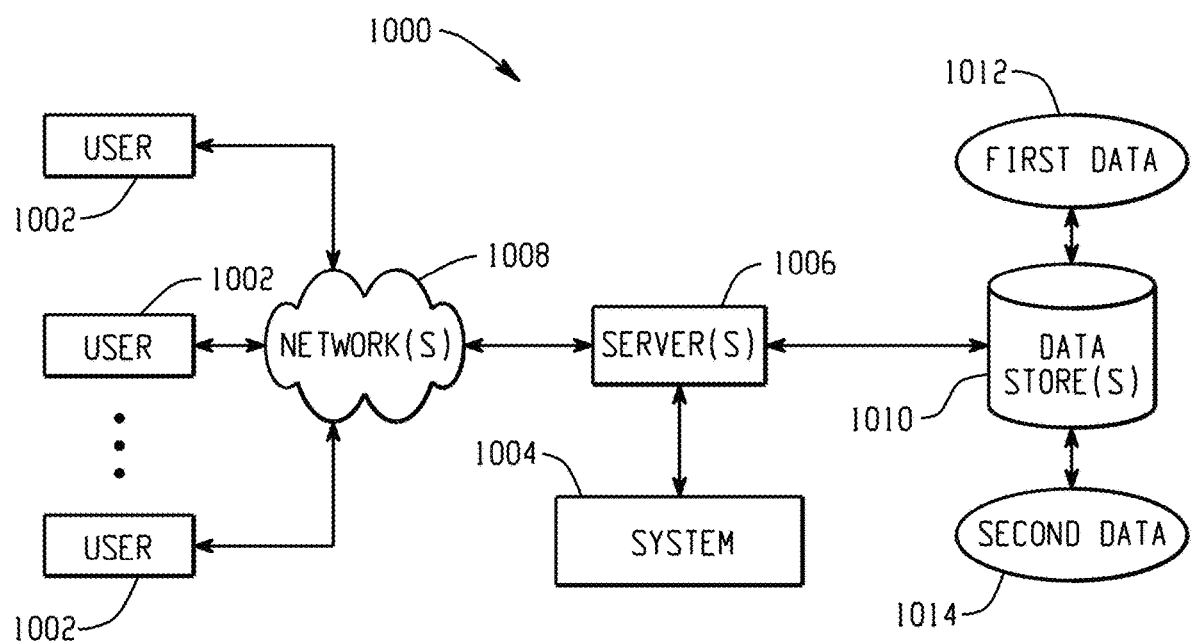
FIGS. 10, 11A, 11B, and 11C depict example systems that may be used to implement the technology disclosed herein.

FIG. 10 depicts at 1000 a computer-implemented environment wherein users 1002 can interact with a system 1004 hosted on one or more servers 1006 through a network 1008. The system 1004 contains software operations or routines. The users 1002 can interact with the system 1004 through a number of ways, such as over one or more networks 1008. One or more servers 1006 accessible through the network(s) 1008 can host system 1004. It should be understood that the system 1004 could also be provided on a stand-alone computer for access by a user.

Figure 11A:
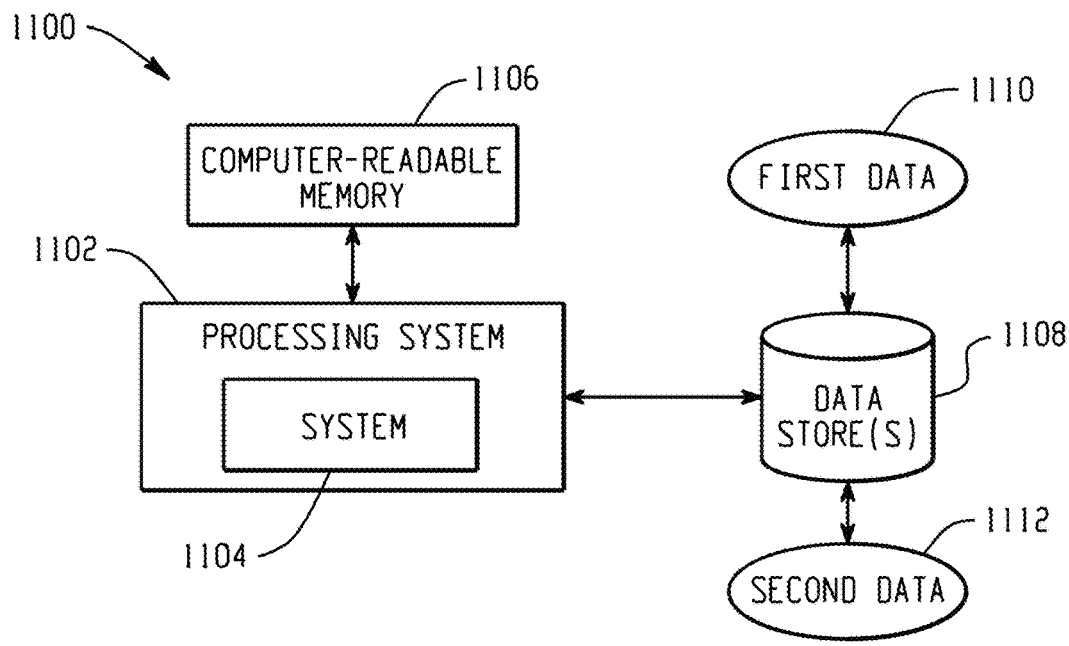
Figure 11B:
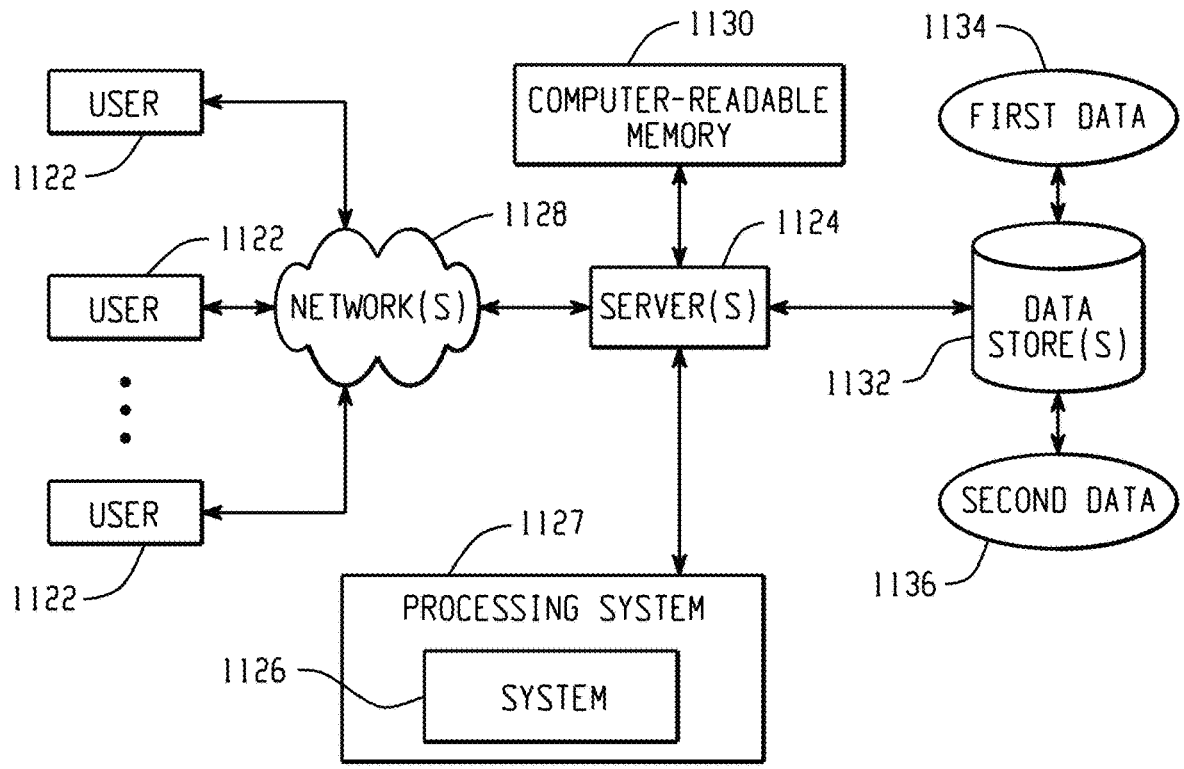
Figure 11C:
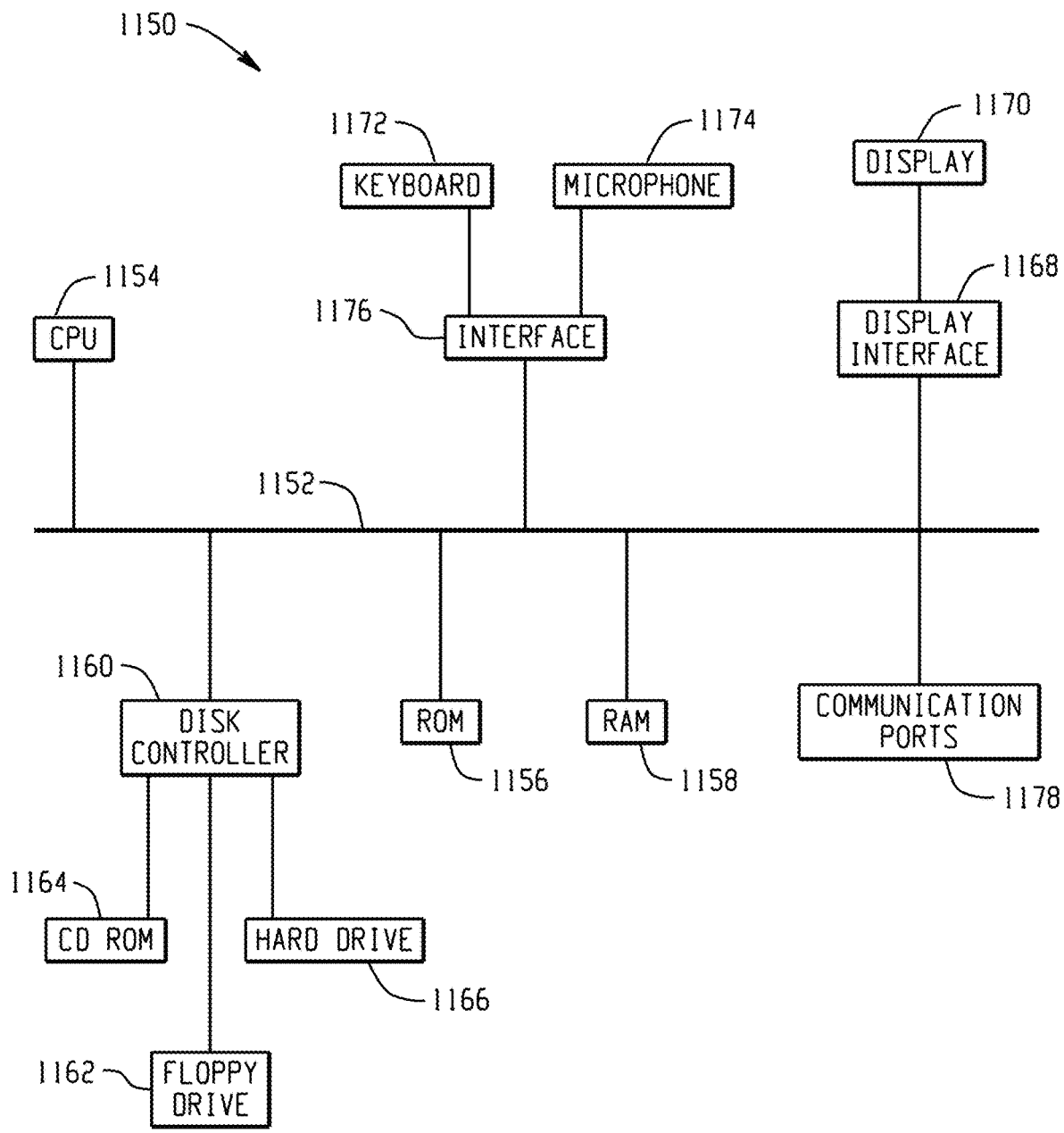

FIGS. 11A, 11B, and 11C depict example systems for use in implementing a system. For example, FIG. 11A depicts an exemplary system 1100 that includes a standalone computer architecture where a processing system 1102 (e.g., one or more computer processors) includes a system 1104 being executed on it. The processing system 1102 has access to a non-transitory computer-readable memory 1106 in addition to one or more data stores 1108. The one or more data stores 1108 may contain first data 1110 as well as second data 1112.

FIG. 11B depicts a system 1120 that includes a client server architecture. One or more user PCs 1122 accesses one or more servers 1124 running a system 1126 on a processing system 1127 via one or more networks 1128. The one or more servers 1124 may access a non-transitory computer readable memory 1130 as well as one or more data stores 1132. The one or more data stores 1132 may contain first data 1134 as well as second data 1136.

FIG. 11C shows a block diagram of exemplary hardware for a standalone computer architecture 1150, such as the architecture depicted in FIG. 11A, that may be used to contain and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors), may perform calculations and logic operations required to execute a program. A non-transitory computer-readable storage medium, such as read only memory (ROM) 1156 and random access memory (RAM) 1158, may be in communication with the processing system 1154 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1160 interfaces one or more disk drives to the system bus 1152. These disk drives may be external or internal floppy disk drives such as 1162, external or internal CD-ROM, CD-R, CD-RW or DVD drives such as 1164, or external or internal hard drives 1166.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processor 1154 may access each component as required.

A display interface 1168 may permit information from the bus 1156 to be displayed on a display 1170 in audio, graphic, or alphanumeric format. Communication with external devices may occur using various communication ports 1178.

In addition to the standard computer-type components, the hardware may also include data input devices, such as a keyboard 1172, or other input device 1174, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

For example, in alternative embodiments, the thermal solver 308 depicted in FIG. 3 may receive simulation data that corresponds to one dimensional simulations, e.g. a line or plurality of lines, or two dimensional simulations, e.g. a pixel or a plurality of pixels, creating a thin wall. In these embodiments the thermal solver 308 can use flux calculation module 312, the fractional rate of change calculation module 314, the flux imbalance calculation module, and the temperature solver 318 to generate a thermal solution 308 for line and thin wall simulations in a similar manner as described with respect to the three dimensional embodiment.

The methods 400 and 500 can also be used to generate thermal solutions in the simulations corresponding to thin wall or line embodiments in a similar manner as described above. In a one dimensional embodiment, steps 402 and 502 may access a line model representing a representative system using one or more processors, wherein the line model includes a plurality of transitions. The plurality of transitions can include a transition between liquid and vapor, between solid and liquid, sintering, and a solid state phase change. The plurality of transitions can include a transition between liquid and vapor, between solid and liquid, sintering, and a solid state phase change. In a two dimensional embodiment, steps 402 and 502 may access a pixel model representing a representative system using two or more processors, wherein the pixel model includes a plurality of transitions. The model can include a first transition associated with a first group of one or more pixels transitioning between liquid and vapor, a second transition associated with a second group of one or more pixels transitioning between solid and liquid, a third transition associated with a third group of one or more pixels undergoing sinter, and a fourth transition associated with a fourth group of one or more pixels undergoing a solid state phase change. The system can then determine a flux imbalance metric based on a flux, a rate of change of the first transition, a rate of change of the second transition, a rate of change of the third transition, and a rate of change of the fourth transition; and determine one or more temperatures for the representative system based on the flux imbalance metric. Using the thermal solution methodology described herein can be advantageous when increasing modeling accuracy or decreasing simulation time in these one and two dimensional embodiments.

The technology described herein may provide certain advantages over known systems, some of which are detailed herein. It should be understood, however, that other advantages, in addition to those expressly detailed herein, may also be possible.

What is claimed:

1. A method for performing a thermal simulation of an additive manufacturing process, comprising:
accessing a voxel model representing a representative system using one or more processors, wherein the voxel model includes a first transition associated with a first group of one or more voxels transitioning between liquid and vapor, a second transition associated with a second group of one or more voxels transitioning between solid and liquid, a third transition associated with a third group of one or more voxels undergoing sinter, and a fourth transition associated with a fourth group of one or more voxels undergoing a solid state phase change;

determining a flux imbalance metric based on a flux, a rate of change of the first transition, a rate of change of the second transition, a rate of change of the third transition, and a rate of change of the fourth transition; and determining one or more temperatures for the representative system based on the flux imbalance metric.

2. The computer implemented method of claim 1, wherein the one or more temperatures is determined at each time increment based on the flux imbalance metric at each converged iteration.

3. The computer implemented method of claim 1, wherein the one or more processors determines a thermal solution for the representative system based on the one or more temperatures.

4. The computer implemented method of claim 3, wherein the thermal solution is used to produce an additive manufacturing component.

5. The computer implemented method of claim 3, wherein the thermal solution is optimized to produce an additive manufacturing component to account for keyhole formation in a material.

6. The computer implemented method of claim 1, wherein the one or more processors determines the flux with an initial flux or a previous flux from a previous iteration, and wherein the one or more processors determines the flux imbalance metric based on a vaporization metric, wherein the vaporization metric is based on a density of the vaporizing material, a latent heat of vaporization, and the rate of change of the first transition.

7. The computer implemented method of claim 1, wherein the one or more processors determines the flux imbalance metric based on a melting metric, wherein the melting metric is based on a density of melting material, a latent heat of fusion, and the rate of change of the second transition.

8. The computer implemented method of claim 7, wherein the melting metric is further based on a curvature of a liquid-solid interface and a surface tension of the liquid.

9. The computer implemented method of claim 8, wherein the curvature of the liquid-solid interface and the surface tension of the liquid are based on a first melt pool energy from a drop-liquid interface, a second melt pool energy from a solid-substrate interface, and a third melt pool energy from a liquid-substrate interface.

10. The computer implemented method of claim 1, wherein the one or more processors determines the flux imbalance metric based on a sintering metric, wherein the sintering metric is based on a heat capacity of a powder, the solidus temperature of a solid, and the rate of change of the third transition.

11. The computer implemented method of claim 1, wherein the one or more processors determines the flux imbalance metric based on a phase change metric, wherein the phase change metric is based on a density of the phase change material, a latent heat of the solid state change, and the rate of change of the fourth transition.

12. A system for performing a thermal simulation of an additive manufacturing process, comprising:
one or more processors;
one or more non-transitory computer readable medium; and
a thermal solver application stored on the one or more non-transitory computer readable medium and executable by the one or more processors, the thermal solver when executed being configured to:
access a voxel model representing a representative system, wherein the voxel model includes a first transition of a first group of one or more voxels transitioning between liquid and vapor, a second transition of a second group of one or more voxels transitioning between solid and liquid, a third transition of a third group of one or more voxels undergoing sinter, and a fourth transition of a fourth group of one or more voxels undergoing a solid state phase change;
determine a flux imbalance metric based on a flux, a rate of change of the first transition, a rate of change of the second transition, a rate of change of the third transition, and a rate of change of the fourth transition;
determine one or more temperatures for the representative system at each time increment based on the flux imbalance metric at each converged iteration; and
determine a thermal solution for the representative system based on the one or more temperatures.

13. The system for performing a thermal simulation of claim 12, wherein the thermal solution is used to produce an additive manufacturing component.

14. The system for performing a thermal simulation of claim 12, wherein the thermal solution is optimized to produce an additive manufacturing component to account for keyhole formation in a material.

15. The system for performing a thermal simulation of claim 12, wherein the flux is determined with an initial flux or a previous flux from a previous iteration, and wherein flux imbalance metric is based on a vaporization metric, wherein the vaporization metric is based on a density of the vaporizing material, a latent heat of vaporization, and the rate of change of the first transition.

16. The system for performing a thermal simulation of claim 12, wherein the flux imbalance metric is based on a melting metric, wherein the melting metric is based on a density of a melting material, a latent heat of fusion, and the rate of change of the second transition.

17. The system for performing a thermal simulation of claim 16, wherein the melting metric is further based on a curvature of a of a liquid-solid interface and a surface tension of the liquid.

18. The system for performing a thermal simulation of claim 17, wherein the curvature of the liquid-solid interface and the surface tension of the liquid are based on a first melt pool energy from a drop-liquid interface, a second melt pool energy from a solid-substrate interface, and a third melt pool energy from a liquid-substrate interface.

19. The system for performing a thermal simulation of claim 12, wherein the flux imbalance metric is based on a sintering metric, wherein the sintering metric is based on a heat capacity of a powder, a solidus temperature of a solid, and the rate of change of the third transition.

20. The system for performing a thermal simulation of claim 12, wherein the flux imbalance metric is based on a phase change metric, wherein the phase change metric is based on a density of the phase change material, a latent heat of the solid state change, and the rate of change of the fourth transition.

21. A method for performing a thermal simulation of an additive manufacturing process, comprising:
    accessing a pixel model representing a representative system using one or more processors, wherein the model includes a first transition associated with a first group of one or more pixels transitioning between liquid and vapor, a second transition associated with a second group of one or more pixels transitioning between solid and liquid, a third transition associated with a third group of one or more pixels undergoing sinter, and a fourth transition associated with a fourth group of one or more pixels undergoing a solid state phase change;
    determining a flux imbalance metric based on a flux, a rate of change of the first transition, a rate of change of the second transition, a rate of change of the third transition, and a rate of change of the fourth transition; and
    determining one or more temperatures for the representative system based on the flux imbalance metric.

22. The system for performing a thermal simulation of claim 21, wherein the thermal solution is used to produce an additive manufacturing component.

23. The system for performing a thermal simulation of claim 21, wherein the thermal solution is optimized to produce an additive manufacturing component to account for keyhole formation in a material.

24. The system for performing a thermal simulation of claim 21, wherein the flux is determined with an initial flux or a previous flux from a previous iteration, and wherein flux imbalance metric is based on a vaporization metric, wherein the vaporization metric is based on a density of the vaporizing material, a latent heat of vaporization, and the rate of change of the first transition.

25. The system for performing a thermal simulation of claim 21, wherein the flux imbalance metric is based on a melting metric, wherein the melting metric is based on a density of a melting material, a latent heat of fusion, and the rate of change of the second transition.

26. The system for performing a thermal simulation of claim 21, wherein the melting metric is further based on a curvature of a of a liquid-solid interface and a surface tension of the liquid.

27. The system for performing a thermal simulation of claim 21, wherein the curvature of the liquid-solid interface and the surface tension of the liquid are based on a first melt pool energy from a drop-liquid interface, a second melt pool energy from a solid-substrate interface, and a third melt pool energy from a liquid-substrate interface.

28. The system for performing a thermal simulation of claim 21, wherein the flux imbalance metric is based on a sintering metric, wherein the sintering metric is based on a heat capacity of a powder, a solidus temperature of a solid, and the rate of change of the third transition.

29. The system for performing a thermal simulation of claim 21, wherein the flux imbalance metric is based on a phase change metric, wherein the phase change metric is based on a density of the phase change material, a latent heat of the solid state change, and the rate of change of the fourth transition.

* * * * *